United States Patent [19]

Smith

[11] Patent Number: 5,960,071

[45] Date of Patent: Sep. 28, 1999

[54] INHIBITING COMPLETION OF DEFRAUDING CALLS

[75] Inventor: David B. Smith, Hinsdale, Ill.

[73] Assignee: Lucent Technologies Inc., Murray Hill, N.J.

[21] Appl. No.: 08/824,133

[22] Filed: Mar. 27, 1997

[51] Int. Cl.[6] .................................................. H04M 15/00
[52] U.S. Cl. ........................ 379/115; 379/112; 379/114; 379/188; 379/189; 379/120
[58] Field of Search ........................... 379/111–115, 127, 379/133–134, 196–198, 201, 207, 243, 120, 188–189

[56] References Cited

U.S. PATENT DOCUMENTS 5,109,408  4/1992  Greenspan et al. ..................... 379/197
5,774,533  6/1998  Patel ........................................ 379/127
5,805,680  9/1998  Penzias ................................... 379/127

*Primary Examiner*—Paul Loomis
*Assistant Examiner*—Duc Nguyen

[57] ABSTRACT

An arrangement for inhibiting the completion on defrauding calls. Calls to certain area codes are sometimes not subject to the kinds of regulations characteristic of U.S. based area codes. The result is that callers are charged an exorbitant fee (frequently several dollars per minute) without realizing that they are incurring such charges. In accordance with applicant's invention, a data base maintains a record of suspected telephone numbers and calls to the suspected area codes are checked to see if the call is to one of the suspected numbers. If so, the caller is warned and can disconnect before the call is completed. Advantageously, possibly for the payment of the fee, callers are saved from making calls with exorbitant charges.

20 Claims, 2 Drawing Sheets

INHIBITING COMPLETION OF DEFRAUDING CALLS

PROBLEM

United States telephone customers are accustomed to paying only a regular telephone call charge for all calls with certain well known exceptions: a call for directory assistance has a separate charge and calls to numbers with a numbering plan area (NPA) code 900 may charge the caller a charge much higher than the telephone call charge (a charge of $1.00 per minute, for example, for a service such as economic advice is not unusual) or such a call may trigger a voluntary donation for a charity or a cultural entity. The callers who make these calls are well aware of the fact that they are incurring unusual charges, although there are certainly cases in which the size of the charge for a 900 call, especially if made by an unknowing user such as a minor, is unusually high. In some cases, it is a requirement that the caller be notified that charges in addition to normal calling charges will apply.

This general expectation of limited charges for telephone calls with these well known exceptions (and most telephone companies do offer to block calls to 900 numbers if requested by the telephone user) has been taken advantage of by certain off shore "businesses." In particular, the 809 area code is the area code of various Caribbean sea islands whose telephone administrations are not under the control of a restrictive regulatory body such as the U.S. Federal Communications Commission, although they are a party to the North American numbering plan. A common deceptive practice is to leave a message for an individual that a close friend or relative has been in an accident and that a certain telephone number should be called in order to obtain information about this friend or relative. When a naive caller calls this number the recipient of the call attempts to hold the caller for as long a period as possible since the call will be charged at a rate substantially in excess of the tariff for normal calls to that area; the recipient of the call has an arrangement similar to the arrangement between providers of 900 services and the U.S. telephone carriers whereby the foreign carrier collects charges for the call and provides a share of these charges to the recipient of the calls. Such recipients are referred to herein as deceptive practices businesses. Because the called number is a conventional NPA-NXX-XXXX call, the caller is lulled into thinking that it is a conventional long distance call to a regulated area.

A problem of the prior art is that no satisfactory arrangement has been found to warn callers that their call may be to a destination owned by such a deceptive practices business.

SOLUTION

The above problem is substantially alleviated and an advance is made over the teachings of the prior art in accordance with applicant's invention wherein in response to receiving a call to an NPA destination known to house a substantial number of such scam businesses, a check is made of the entire telephone number to determine whether the called number is one which is known or suspected to be the number of such a deceptive practices business, i.e., is known to be the number of a business such that the charge for the call greatly exceeds the normal carrying charge for calls to regular destinations within that NPA area. If it is determined that the call is destined for a destination such that the caller is likely to incur substantial charges in addition to conventional telephone call charges then the caller receives a warning by an announcement, visual indication, or special tone. Advantageously, such a warning is received before the charge is incurred.

In accordance with one preferred embodiment of applicant's invention following the receipt of such an announcement or tone the caller is required to indicate positively an intention to have the call be completed anyway, for example by pressing a 1# on a dual tone multi-frequency (DTMF) telephone key pad. Advantageously, such an arrangement permits the calls to be completed (and an automatic denial of completion of such calls may well be against the international agreements between telephone administrations) while warning callers who are not aware of the characteristics of the called number that they are about to incur excessive charges for their call.

DETAILED DESCRIPTION

Figure 1:
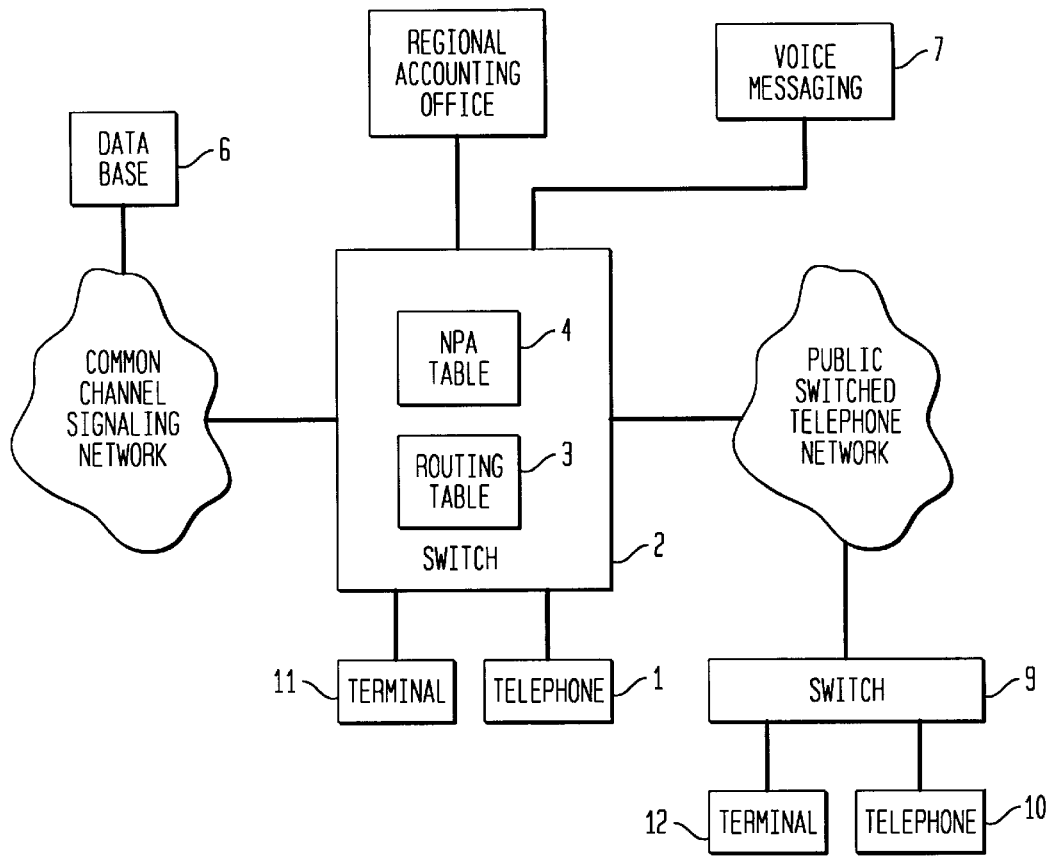
FIG. 1 is a block diagram illustrating the operation of applicant's invention.

FIG. 1 is a block diagram illustrating a telephone call made in accordance with applicant's invention. A caller 1 is connected to a switch 2 which contains a routing table 3 to obtain information for routing the call and an NPA table 4 which contains special information for trapping calls to suspected destinations. If a caller calls a conventional U.S. NPA number the call is completed in the conventional way. If the caller dials an NPA code which includes telephone numbers for the deceptive practices businesses described above or other identified practices that warrant screening of calls, then the switch sends a message over common channel signalling network 5 to a data base 6, shared by a plurality of switches, to inquire whether the specific telephone number is one suspected of belonging to a deceptive practices business. The data base will respond to the switch with a message indicating either that the called number has not been flagged and therefore apparently belongs to a legitimate user, or that the telephone number has been flagged and apparently belongs to a deceptive practices business; in preferred embodiments of applicant's invention the data base gives some details of the characteristics of the type of charge that the caller may incur. In an alternative embodiment, the data base 6 contained within the switch so that a message is unnecessary.

If the call is to a suspected number, then a voice message announcement is connected from an announcement system 7 to the caller to warn the caller. A dual tone multi-frequency (DTMF) and/or dial pulse detection circuit is then connected to the caller in order to detect the caller's confirmation that the call should go through. (If the caller does not want the call to go through the caller can simply hang up or, if preferred, dial or key some other number.) If the call is to be completed the call is routed through public switch telephone network 8 terminating switch 9 to terminating telephone 10 in the conventional manner. Various treatments are offered as described hereinafter.

Clearly, some of these business and some legitimate businesses will have a terminal 12 rather than a simple telephone set 10 and some of the callers may have such terminal 11.

In accordance with an alternate embodiment of applicant's invention, only customers who either have requested the alerting service or who have indicated a willingness to incur a charge for the alerting service will be so alerted; under these circumstances, calls from other customers will simply be completed without checking and without transmitting the warning message. In this embodiment a special list of the caller's class of service is maintained in the caller's switch and this list is examined prior to sending out a message to the data base to determine the characteristic of the called number.

Figure 2:
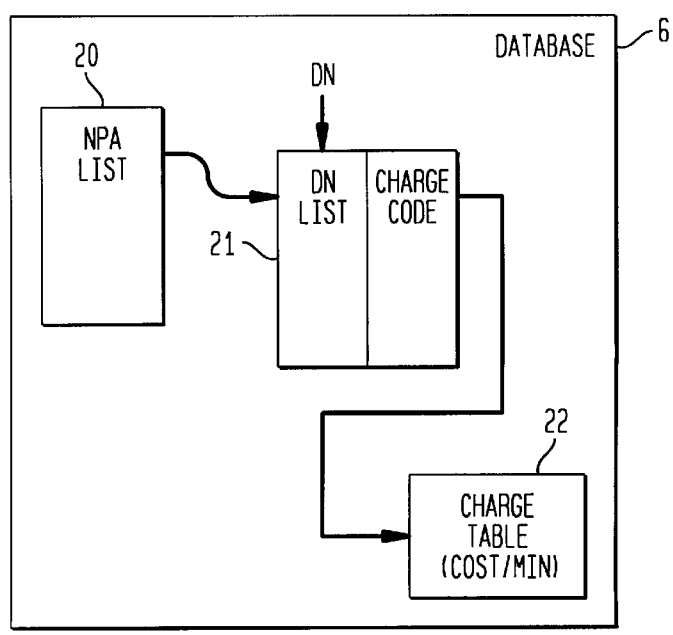
FIG. 2 is a layout of data related to applicant's invention stored in a data base.

FIG. 2 illustrates the information maintained in the data base 6. This includes a list of numbering plan areas (20) and pointers from selected members of that list to a table 21 which includes a list of suspected numbers. Associated with each suspected number is a charge code which is expanded in table 22 to indicate such items as the connection charge and the per minute charge for calls to that destination.

Figure 3:
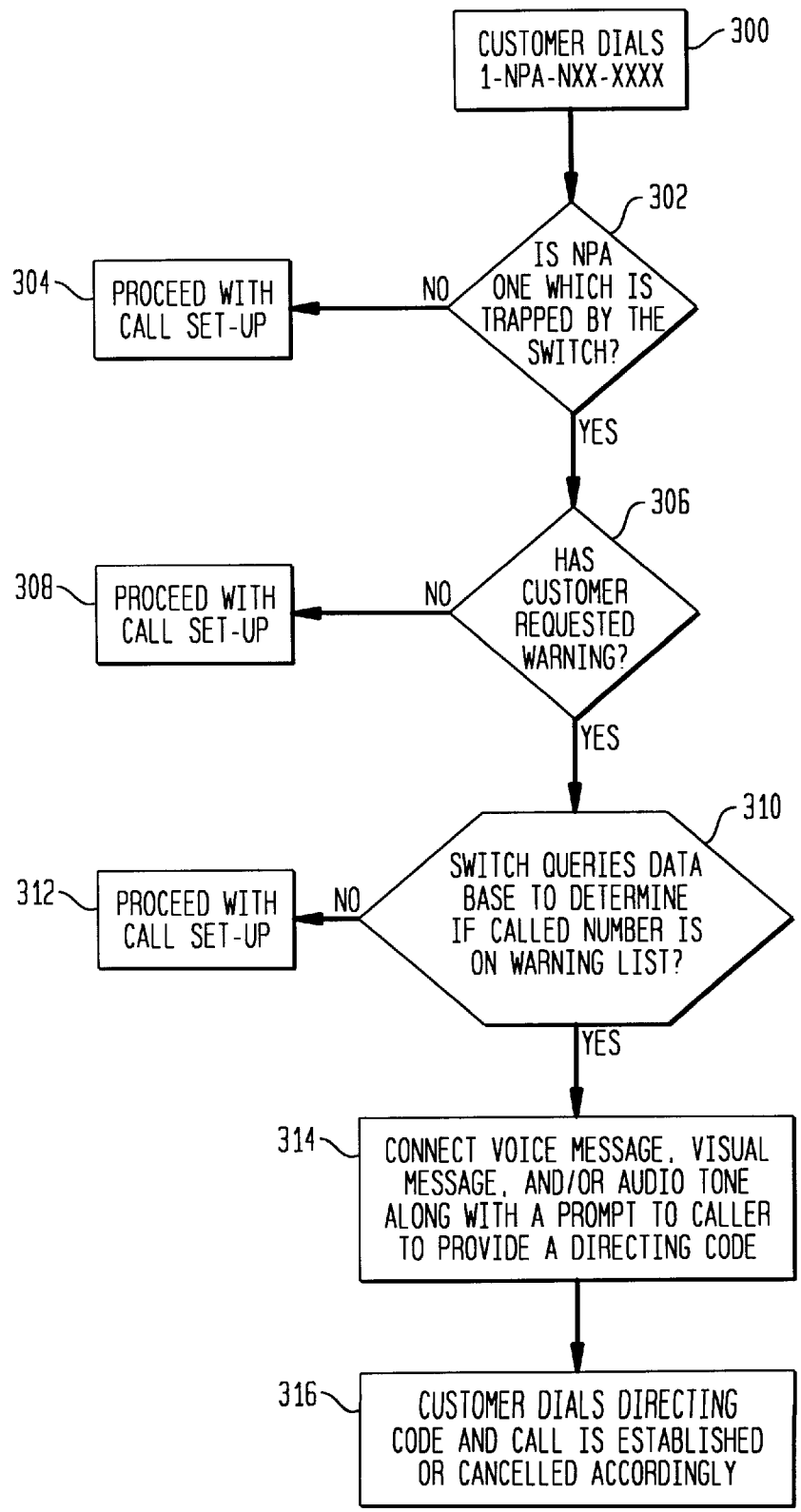
FIG. 3 is a flow diagram illustrating the method of applicant's invention.

FIG. 3 is a flow diagram of a method illustrating applicant's invention. A customer dials a ten digit number (NPA-NXX-XXXX) (action block 300). The originating switch tests the dialed number to determine if the dialed number has an NPA (such as NPA=809) which has been identified as containing telephone numbers of deceptive practices businesses. If it is determined that the NPA does not contain telephone numbers of such businesses, then call processing proceeds in accordance with the prior art (action block 304). If the NPA does contain telephone numbers of suspect businesses, then the originating switch sends a message to the data base to check on the characteristics of the called number and receives a response from that data base. Test 306 determines whether the calling customer has requested warnings on such calls by examining the caller's class of service. Test 306 may be based on the class of service of the calling customer (i.e., whether the calling customer wishes to be warned or not) and may include a test of a threshold, (i.e., what level of charges should trigger a warning). Alternatively, the service can be broadly provided to all customers served by the switch in which case the result of the equivalent of test 306 is always positive. If the results of test 306 is negative, then call processing proceeds as in the prior art (action block 308). If the result of test 306 is positive, i.e., that the calling customer should receive a warning, then the originating switch then performs test 310 to determine whether the called number is on a list of the data base. If not, call processing proceeds as in the prior art (action block 308). If the number is listed in the data base as apparently belonging to a deceptive practices business, then the warning is presented to the customer (action block 314). This warning may be a voice message, it may be a special tone, if customers can be trained to recognize that special tone, or the indication may be visual if the caller has a terminal that presents visual information.

In accordance with one preferred embodiments, number of options can be specified by the customer by dialing a directing code, in the case, X#. For example, if the caller dials 1#, the call can simply be completed as dialed. If the caller dials 2# (or hangs up) the call is canceled. If the caller dials 3# the call is canceled and a record is automatically made of the call. If the customer dials 4# the call is completed but the time being specified is provided to caller in accordance with the caller's class of service. If the caller dials 5# then the call is completed but a cost reminder is provided to the caller, the amount of the cost being determined by a timer applied against information stored in the database. If the caller dials 6# the caller indicates that the caller may consider talking to the called party if the called party is willing to consider talking to callers who are not willing to pay the full charge. Under these circumstances the caller and called party can then negotiate the cost of the call or the called party can provide an alternate telephone number which will result in a call with a lower charge.

There are a number of ways to populate data base 6. Customer complaints followed by a verification call by the telephone service can identify such calls.

Another source of data is a tariff lookup. This is used is when the calling service provider has access to the tariff charged for telephone numbers in the NPA code identified as having deceptive practices businesses. It is necessary to be able to have immediate access to such tariffs if the customer is making an operator assistance call requiring time and charge information or if the customer calls from a hotel/motel and the charge is required immediately to bill the caller. However, if this tariff data base is only accessible on an individual call basis, this method alone is inadequate.

The service provider can examine billing records to determine if there are unusually high charges for calls to any number in the suspected NPA code areas. An important source is likely to be customer complaints which, when verified, can be used to populate the data base 6 forewarning subsequent customers. For the case of operator assistance calls it should be made possible for operators to key a special code with the result that the number of the call just placed by the operator is either directly inserted into data base 6 or is presented to the administrator of data base 6 for subsequent verification.

A special tone used for alerting the caller can also be used by a computer attached to the caller's telephone, to detect the warning and automatically disconnect the call; this would prevent a connection to a deceptive practices business made by the computer with or without the caller's knowledge.

I claim:

1. A method of reducing the number of telephone calls to destinations not identified by a service access code, but having conventional North American routing numbering plan telephone numbers, but which charge the caller a substantial amount in excess of toll carrying charges, comprising the steps of:

responsive to receipt of a telephone call to a destination identified by a called NPA-NXX-XXXX telephone number, wherein said NPA code is not a service access code, determining whether the NPA code contains destination telephone numbers for which excess charges are incurred;

responsive to determining that the NPA code contains ones of said destination telephone numbers, determining whether the called number is one of said destination telephone numbers; and responsive to determining that the called telephone number is one of said destination telephone numbers, issuing a warning signal indicating that the call may incur extra charges to said caller telephone.

2. The method of claim 1 further comprising the step of:

terminating said call without establishing a connection to said called number if said caller does not provide an additional signal in response to said warning signal.

3. The method of claim 1 wherein the step of determining whether the called number is one of said destination telephone numbers comprises the steps of:

transmitting the called number to a data base shared by a plurality of switches;

determining in said data base whether the called number is one of said destination telephone numbers; and transmitting a response message to the querying switch, said response message comprising the results of the determination.

4. The method of claim 1 wherein the step of determining whether the called number is one of said destination telephone numbers comprises the step of consulting a local data base in an originating switch to determine whether the called number is one of said destination telephone numbers.

5. The method of claim 1 wherein the step of issuing a warning signal comprises the step of transmitting a special tone to said caller telephone.

6. The method of claim 5 wherein said special tone is recognizable by a computer associated with said caller telephone for causing said computer to initiate a disconnect of said call.

7. The method of claim 1 wherein said warning signal comprises a prompting message.

8. The method of claim 7 wherein said prompting message provides options to the caller to which the caller can respond by dialing directing information.

9. The method of claim 1 wherein the step of issuing a warning signal comprises the step of transmitting a signal for actuating a visual indication to said caller telephone.

10. The method of claim 1, further comprising the steps of:

providing a class of service to said caller telephone;

wherein the step of providing said warning signal comprises the steps of providing said warning signal only if said caller has been provided with said class of service.

11. Apparatus for reducing the number of telephone calls to destinations not identified by a service access code, but having conventional North American routing numbering plan telephone numbers, but which destinations charge the caller a substantial amount in excess of the toll carrying charges, comprising:

means responsive to receipt of a telephone call to a destination identified by a called NPA-NXX-XXXX telephone number, wherein said NPA code is not a service access code, for determining whether the NPA code contains destination telephone numbers for which excess charges are incurred;

means, responsive to determining that the NPA code contains ones of said destination telephone numbers, for determining whether the called number is one of said destination telephone numbers; and means, responsive to determining that the called telephone number is one of said destination telephone numbers, for issuing a warning signal indicating that the call may incur extra charges to said caller telephone.

12. The apparatus of claim 11, further comprising:

means for terminating said call without establishing a connection to said called number if said caller does not provide an additional signal in response to said warning signal.

13. The apparatus of claim 11, wherein said means for determining whether the called number is one of said destination telephone numbers, comprises:

means for transmitting the called number to a database shared by a plurality of switches;

means for determining in said database, whether the called number is one of said destination telephone numbers; and means for transmitting a response message to the querying switch, said response message comprising the results of the determination.

14. The apparatus of claim 11, wherein the means of determining whether the called number is one of said destination telephone numbers comprises:

means for consulting a local database in an originating switch to determine whether the called number is one of said destination telephone numbers.

15. The apparatus of claim 11, wherein the means for issuing a warning signal comprises:

means for transmitting a special tone to said caller telephone.

16. The apparatus of claim 15, wherein said means for transmitting a special tone is recognizable by a computer associated with said caller telephone for causing said computer to initiate a disconnect of said call.

17. The apparatus of claim 1, wherein said means for issuing a warning signal comprises:

means for transmitting a prompting message.

18. The apparatus of claim 17, wherein said means for transmitting a prompting message providing options to the caller, to which the caller can respond by dialing directing information.

19. The apparatus of claim 11, wherein the means for issuing a warning signal, comprises:

means for transmitting a signal for actuating a visual indication to said caller telephone.

20. The apparatus of claim 11, further comprising:

means for providing a class of service to said caller telephone;

wherein the means for providing said warning signal, comprises means for providing said warning signal only if said caller has been provided with said class of service.

* * * * *